(12) United States Patent
Buettner et al.

(10) Patent No.: US 10,046,375 B2
(45) Date of Patent: Aug. 14, 2018

(54) TOOL COMPONENTS AND RELATED MACHINES AND METHODS (75) Inventors: Stefan Buettner, Markgroeningen (DE); Wolfgang Laib, Besigheim (DE); Arnim Bruechle, Gammertingen (DE); Markus Hees, Vaihingen/Enz (DE); Yakup Coskun, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 1189 days.

(21) Appl. No.: 13/240,367

(22) Filed: Sep. 22, 2011

(65) Prior Publication Data
US 2012/0067187 A1   Mar. 22, 2012

Related U.S. Application Data (63) Continuation of application No. PCT/DE2010/000317, filed on Mar. 23, 2010.

(30) Foreign Application Priority Data

Mar. 25, 2009   (DE) .................... 20 2009 003 795 U (51) Int. Cl.
*B26F 1/14*   (2006.01)
*B21D 28/14*   (2006.01)
(Continued)

(52) U.S. Cl.
CPC ............ *B21D 28/14* (2013.01); *B21D 28/265* (2013.01); *B21D 28/34* (2013.01); *B23Q 17/00* (2013.01);
(Continued)

(58) Field of Classification Search
CPC .... B21D 28/005; B21D 28/14; B21D 28/346; B26F 2001/4409–2001/449; B26F 1/14; Y10T 83/9437
(Continued)

(56) References Cited

U.S. PATENT DOCUMENTS 1,232,099 A * 7/1917 Schoenert ............... B23G 5/06
                                                    408/222
1,754,736 A * 4/1930 Bryant .................... B25B 27/18
                                                    408/222
(Continued)

FOREIGN PATENT DOCUMENTS

CN          1252336 A        5/2000
DE     102007022242 A1      11/2008
(Continued)

OTHER PUBLICATIONS

Notification of Transmittal of Translation of the International Preliminary Report on Patentability from corresponding PCT Application No. PCT/DE2010/00317, dated Oct. 6, 2011, 6 pages.
(Continued)

*Primary Examiner* — Jason Daniel Prone
*Assistant Examiner* — Samuel A Davies
(74) *Attorney, Agent, or Firm* — Fish & Richardson P.C.

(57) ABSTRACT

In some aspects of the invention, tool components for processing of plate-like workpieces, the tool component include an end face adjoined by a tool region provided for regrinding, the tool region being configured to undergo regrinding as a result of wear; and at least one identification mark located on the tool component to indicate the amount of shortening of the tool region as a result of regrinding.

17 Claims, 3 Drawing Sheets (51) Int. Cl.
*B21D 28/26* (2006.01)
*B21D 28/34* (2006.01)
*B23Q 17/00* (2006.01)

(52) U.S. Cl.
CPC ............... *B26F 1/14* (2013.01); *Y10T 83/866* (2015.04); *Y10T 83/9437* (2015.04)

(58) Field of Classification Search
USPC ...... 83/522.7, 525, 529, 530, 690; 408/72 R, 408/222
See application file for complete search history.

(56) References Cited

U.S. PATENT DOCUMENTS

| | | | | |
|---|---|---|---|---|
| 2,364,401 | A | * | 12/1944 | Stellin .............................. 83/690 |
| 3,742,809 | A | * | 7/1973 | Zifferer ............................ 411/61 |
| 3,799,023 | A | * | 3/1974 | Brignard et al. ................ 83/663 |
| 5,031,487 | A | * | 7/1991 | Polonsky ................ B25B 27/18 7/158 |
| 5,033,343 | A | * | 7/1991 | Gerber ............................ 83/74 |
| 6,129,297 | A | * | 10/2000 | Sawant et al. ............. 241/101.3 |

| | | | |
|---|---|---|---|
| 2001/0041108 | A1 | * 11/2001 | Sawabe .................. B23G 5/005 408/59 |
| 2006/0081107 | A1 | 4/2006 | Iwamoto et al. |
| 2010/0319810 | A1 | 12/2010 | Patsch et al. |

FOREIGN PATENT DOCUMENTS

| | | |
|---|---|---|
| EP | 1066991 A2 | 1/2001 |
| EP | 1870260 A1 | 12/2007 |
| JP | 1128663 A | 2/1999 |
| JP | 2002205245 A | 7/2002 |
| JP | 2003117310 A | 4/2003 |
| JP | 2003225582 A | 8/2003 |
| JP | 2006095603 A | 4/2006 |
| JP | 2007245165 A | 9/2007 |
| JP | 2007253183 A | 10/2007 |
| JP | 2008147423 A | 6/2008 |

OTHER PUBLICATIONS

International Search Report from corresponding PCT Application No. PCT/DE2010/000317, dated Aug. 4, 2010, 4 pages.

* cited by examiner

TOOL COMPONENTS AND RELATED MACHINES AND METHODS

CROSS REFERENCE TO RELATED APPLICATIONS

This application is a continuation of, and claims priority under 35 U.S.C. § 120 to, PCT Application No. PCT/DE2010/000317, filed on Mar. 23, 2010, which claimed priority to German Application No. 20 2009 003 795, filed on Mar. 25, 2009. The contents of both of these priority applications are hereby incorporated by reference in their entirety.

TECHNICAL FIELD

The present invention relates to tool components and related machines and methods.

BACKGROUND

When regrinding tool components, such as a tool die or tool stamp, the length of the tool component decreases relative to the end face of the tool component by a thickness of the material that is ground away during regrinding (i.e., the regrinding length). During the lifetime of the tool component, the length of the component decreases gradually as the number of regrinding operations increases.

The information relating to the current regrinding length or the regrinding state of a tool component (e.g., a punching stamp for a punching processing operation), is typically used for optimizing the travel of the tool component during use. For example, the current punching stamp length is used both for calculating the position of the lower component (e.g., the tool die) in order to ensure that the workpiece is fully punched through, and for calculating the position at which the punching stamp is completely withdrawn from the workpiece. The regrinding length can also be used to determine if a required amount of punching travel can be performed using a selected combination of an upper tool component, such as a punching stamp and a lower tool component, such as a tool die. For example, the regrinding length can be used to determine whether or not a tool stamp is long enough to perform a required amount of punching travel while taking into account the workpiece thickness.

With tool dies, it is also useful to accurately know the regrinding length in order to provide a height compensation corresponding to the regrinding operation. Height compensation can be achieved by placing compensation discs having combined thicknesses that correspond to the regrinding length below the die so that an upper edge of the die is in alignment with the operating plane of the workpiece, regardless of the regrinding state.

It is also advantageous to be able to differentiate tool components that are new or that have not been reground from those components that have undergone at least one regrinding operation. The term tool component, as used herein, is intended to refer to various different tooling components, such as punching stamps, stamp inserts, multi-use stamps or dies or die inserts, shaping stamps, shaping dies, punching needles, and other similar tools.

The current regrinding state of a tool or tool component is typically determined by measuring the tool or tool component. This typically requires an additional operational step that requires the use of a suitable measuring device (e.g., a caliper gauge).

JP 2002 205245 A discloses a device for measuring the regrinding length of a punching stamp. To measure the regrinding length, a punching stamp is placed on a reference surface in order to bring the center of the stamp into alignment with the center of a measuring device and to position the stamp on a compensation plate. The regrinding length of the punching stamp is then measured using the measuring device.

SUMMARY

In some aspects of the invention, a tool component includes at least one identification mark for displaying the regrinding state (i.e., to indicate the distance by which the tool component has shortened due to regrinding). The identification mark typically describes the regrinding state in such a manner that the regrinding length can be determined by an operator without an additional measuring operation.

In some embodiments, the identification mark extends along the tool region provided for regrinding in a direction perpendicular relative to the end face of the tool component. The identification mark is typically partially removed with each regrinding operation so that the identification mark is modified by each regrinding operation. The identification mark of the tool component can be constructed in such a manner so that the previous length indication is removed by the regrinding operation and the current length indication (i.e., after regrinding) is made visible or remains visible so that the current regrinding state can be determined without a measurement operation or an inscription to indicate the regrinding state being required after the regrinding operation.

In some embodiments, the end face of the tool component is adjoined by an inclined portion formed circumferentially around the end face, and the identification mark typically extends in a helical manner around the inclined portion. Typically, the tool component having this type of identification mark is a tool die and the inclined portion can be formed by a continuous chamfer around the end face. On tool dies, the maximum regrinding length is relatively small and is typically about 1 mm. The helical identification mark can have a pitch that is selected in such a manner that this regrinding length is travelled during one revolution around the helical identification mark. In this manner, it is possible to determine the relatively small amount of regrinding (e.g., typically 0.3 mm or less) when regrinding since the identification mark, due to the small pitch, is removed during each regrinding operation over a relatively large angular range which the operator can detect without an additional measurement operation.

In some embodiments, the tool component includes a scale for reading the state of the identification mark. The scale facilitates the identification of the current regrinding state of the tool component because the proportion of the identification mark that has been removed during regrinding can be more easily detected using the scale. However, the scale should not be removed with the identification mark. To prevent the scale from being removed, grooves that have a greater depth than the regrinding length can be provided along the inclined portion or applied to the tool component outside the region that undergoes the regrinding operation.

In some embodiments, the scale is constructed in the form of a dial so that the angular range removed during regrinding can be detected in a relatively simple manner. The scale can have multiple marks that are distributed in an equidistant manner along the periphery so that the entire angular range of 360° is subdivided into angular subranges. In some embodiments, the scale includes 12 marks to create subranges of 30°. Using such a scale, a reading precision of less than 0.1 mm can be achieved with a regrinding length of 1 mm. The number of marks can also be selected to be smaller or greater than twelve. It is also possible to determine the regrinding state of the identification mark without using a scale.

In some embodiments, at least one feature (e.g., the color or the shape) of the identification mark changes depending on the spacing from the end face. In some cases, the feature changes gradually. The identification mark itself may serve as a scale when the features gradually change due to the regrinding operation. When using identification marks that have gradually changing features, it is typically unnecessary to provide an additional scale which is not removed.

In some embodiments, the identification mark includes multiple recesses that extend through the end face to different depths into the tool region provided for regrinding. Of the recesses with different depths, those with the smallest depth are the first to be removed during regrinding operations. By the number of recesses still remaining after regrinding, it is possible to determine the regrinding state of the tool component. In some cases, the depth of each recess is a multiple of a regrinding amount, which typically corresponds to the depth of the recess with the smallest depth. By having the depth of each recess equal to a multiple of the regrinding amount, the recesses can define a linear scale to indicate the total amount of material removed and the number of recesses removed due to regrinding increases in a linear manner over the course of multiple regrinding processes. An identification mark in the form of a stepped hole can alternatively or additionally be provided at the end face. The number of steps in such a stepped hole can provide information relating to the regrinding state of the tool component.

In some embodiments, the identification mark is constructed in the form of a plug, which is inserted into an opening (e.g., a hole) formed in the end face of the tool component. The plug, which is typically pressed into the opening, can have portions of different colors and/or thicknesses, by which the regrinding state can be determined by an operator who can observe the current color or thickness of the portion at the end face of the tool component. This configuration is typically used with punching stamps and tool dies that have a relatively large maximum regrinding length (e.g., 6-7 mm) so that the portions of the plug are sufficiently large to enable error-free reading.

In some embodiments, the identification mark is arranged with a predetermined spacing relative to the end face and is typically formed outside the tool region provided for regrinding. Typically, such identification marks can be provided on a tool stamp to form a limit mark which corresponds to the insertion depth of the workpiece to be processed having the maximum thickness. The regrinding length is taken into account when determining the spacing. If the identification mark is arranged with such a spacing, it helps to ensure that the identification mark is not only not removed during the grinding operation, but is also outside the range of the tool cutting edge that comes into contact with the workpiece. Therefore, the identification mark is typically protected from removal during workpiece processing.

In some embodiments, the identification mark is applied with a predetermined spacing relative to the end face that corresponds to the maximum regrinding length of the tool component. In combination with the limit mark described above, a pattern can be established by which the suitability of the tool stamp for various applications can be verified. Other markings, as described herein, can also be arranged along the cutting edge of the tool with various spacings from the end face in order to create a scale by which the regrinding state of the tool component can be more easily determined.

In some embodiments, an identification mark is applied (e.g., in the form of an inscription) along the end face. The end-face inscription can designate the state of the tool component as being new since the inscription would be removed during a first regrinding operation. Therefore, tool components that have undergone a regrinding operation can be differentiated from tool components that are new. It is also possible to identify tool components that do not yet require regrinding and thus can continue to be used.

In some embodiments, an identification mark is constructed for reading on at least one other feature of the tool component. The identification mark can contain additional information relating to the type of tool component. Examples of information that can be contained in identification mark include a length indication or an association of the tool component with a specific tool group. One or more additional identification marks that contain only information that is not related to the regrinding state can also be provided on the tool component.

In another aspect of the invention, a machine tool for punching and/or shaping plate-like workpieces (e.g., metal sheets) includes at least one tool component, as described herein. In some cases, the machine tool can include various tools, such as combinations of upper and lower tool components (e.g., combinations of stamps and dies) which may be secured in an associated receiving member for a workpiece processing operation.

Using the tool components and methods described herein, the regrinding state of a tool or tool component can be determined in a relatively simple manner by including indication marks on the tool components to indicate tool wear.

The details of one or more embodiments of the invention are set forth in the accompanying drawings and the description below. Other aspects, features, and advantages of the invention will be apparent from the description and drawings, and from the claims.

DETAILED DESCRIPTION

Figure 1:
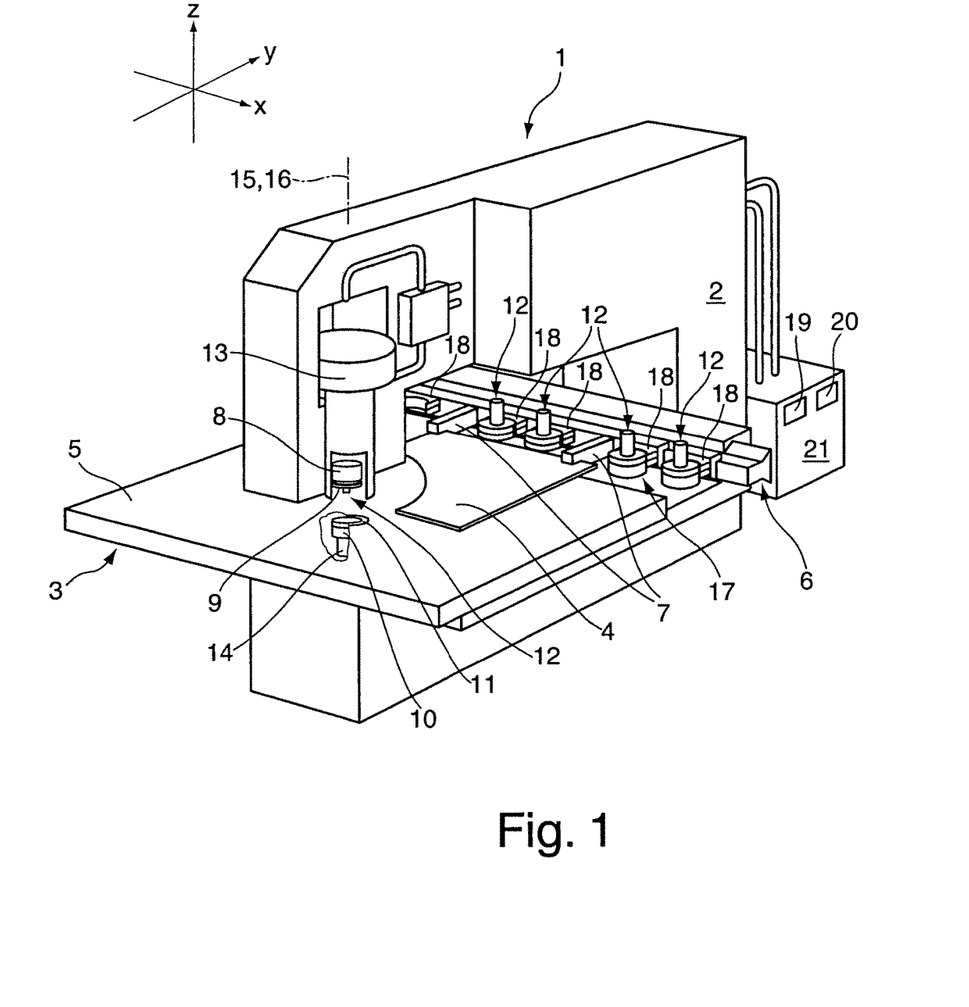
FIG. 1 is a schematic illustration of a machine tool for processing plate-like workpieces.

FIG. 1 illustrates a machine tool 1 for punching and/or shaping plate-like workpieces, such as metal sheets. The punching/shaping machine 1 has a C-shaped machine frame 2 that includes a workpiece support in the form of a workpiece table 3 that serves to support a workpiece (e.g., a metal sheet) 4. At the upper side of the workpiece table 3, a horizontal support plane 5 is formed that extends along an x-direction and a y-direction and supports the metal sheet 4 to be processed. Using a co-ordinate guide 6, the metal sheet 4, which is clamped to the coordinate guide 6 by collet chucks 7, can be moved along the support plane 5 of the workpiece table 3.

At the front end of the upper member of the C-shaped machine frame 2, a tool stamp receiving member 8 is arranged in which a punching tool 9 having a punching stamp is supported. Additionally, a tool die receiving member 10 in which a tool die 11 is supported is provided at the front end of the lower member of the C-shaped machine frame 2. The punching tool 9 and the tool die 11 together form a tool unit 12 for the separating and/or shaping processing operation of the metal sheet 4.

A drive unit of the punching/shaping machine 1 is formed by a stamp drive 13 and a die drive 14 that are powered by linear drives. Using the stamp drive 13, the tool stamp receiving member 8 together with the punching tool 9 that is supported thereon or secured thereto can be raised and lowered along a travel axis 15 with respect to the workpiece table 3. In a comparable manner, the tool die receiving member 10 together with the tool die 11 which is supported or secured therein can be raised and lowered along the travel axis 15 with respect to the workpiece table 3 by the die drive 14. The tool stamp receiving member 8 and the tool die receiving member 10 can further be rotationally adjusted about a tool rotation axis 16 which is identical to the travel axis 15 by means of a rotary drive which is not shown in greater detail.

A linear magazine 17 with additional tool units 12 is provided on the co-ordinate guide 6. The tool units 12 located along the linear magazine 17 are each retained by a tool cartridge 18 and, depending on requirements, can be secured to the tool stamp receiving member 8 or the tool die receiving member 10 for processing the metal sheet 4.

When a tool is changed and when a workpiece is processed, the drives (e.g., the stamp drive 13 and the die drive 14) of the punching/shaping machine 1 are controlled by a numerical control unit 21. The numerical control unit 21 includes a storage device 19 for storing tool data and an additional control device 20 in order to measure and control the lifting, lowering and rotational movements of both the tool stamp receiving member 8 and the tool die receiving member 10 based on the stored data relating to the workpiece 4 and the tool 12, respectively. The storage device 19 can include information relating to the regrinding state of the tool die 11 and also to the multiple tool stamps 9 positioned in respective tool cartridges 18. The information can be provided by a machine operator based on the regrinding state established during the preliminary set-up operation.

Figure 2:
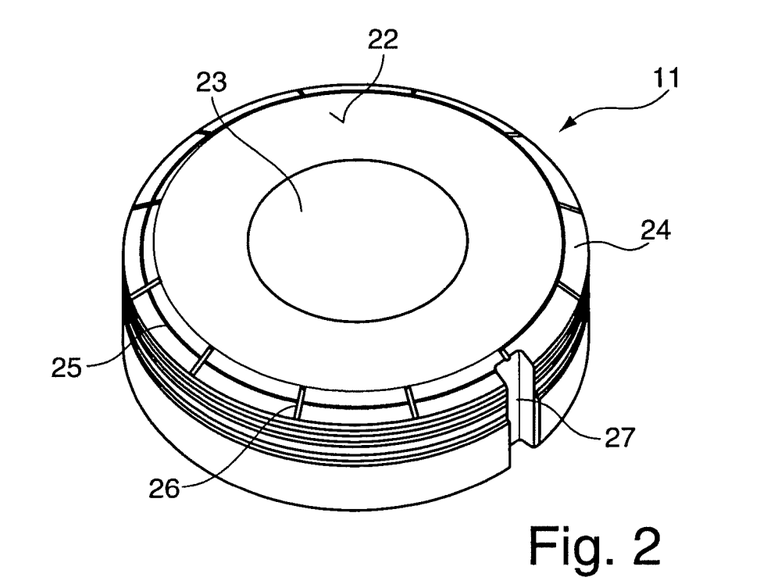
FIG. 2 illustrates a tool die having an identification mark in the form of a helix.

In order to obtain information relating to the regrinding state of the tool die 11 in a simple manner, and without subsequent measurement, the tool die can be constructed to have an identification mark. For example, as shown in FIG. 2, the substantially cylindrical tool die 11 has an end face 22 with a circular opening 23 for the engagement of a punching tool (e.g., a punching stamp). Along the end face 22 of the tool die 11, a radially substantially continuous, frustoconical inclined portion 24 (e.g., an inclined ramp or chamfer) is formed having an identification mark 25 in the form of a helical line with a substantially constant pitch. The inclined portion 24 also includes a scale 26 in the form of a dial with twelve grooves that extend outward radially.

The helical identification mark 25 extends outward along the inclined portion 24 relative to the end face 22 to a distance that is positioned away from the end face that corresponds to the maximum regrinding amount (e.g., about 1 mm axially from the end face 22). The pitch of the helical line 25 is selected in such a manner that, during a revolution of 360° to and from a wedge-like groove 27 that extends in an axial direction, the identification mark 25 travels a distance of 1 mm in the axial direction perpendicular to the end face 22.

When the tool die 11 is reground, it is ground flat at the end face 22 and an angular portion of the identification mark 25 associated with the respective regrinding length is eliminated. When the tool die 11 is new (i.e., having a regrinding length of 0 mm), the line 25 can be seen over its entire 360° range. In the completely reground state, the helical identification mark 25 is completely removed. In a region of the regrinding length between 0 mm<x<1 mm, an angular range of (y°) of the identification mark 25 can be seen. The relationship of $x/1\ mm = z°/360°$ can be used to determine the regrinding amount, where the angular range z° represents the angular range of the portion of the identification mark 25 that can no longer be seen. The portion of the identification mark 25 that can no longer be seen (z°) can be determined relatively simply by inspecting the portion of the identification mark 25 that can be seen (y°), as described below, by using the following equation $z° = 360° - y°$. There is a linear relationship between the regrinding amount and the angular range of the identification mark that can no longer be seen, thereby enabling simple identification by an operator to determine the amount of material removed due to regrinding.

In the manner described above, the regrinding length is determined from the angular range of the identification mark 25 that is removed during regrinding, which can be assessed visually. If, as described above, a scale 26 is used that corresponds to reading a clock (e.g., using scale marks positioned like the 5-minute intervals of a clock so that the scale marks are spaced 30° from each other), the regrinding amount of the die on the scale 26 can be read in increments (e.g., $1\ mm \times 30°/360° = 0.08\ mm$ increments). The reading precision can be increased further if the scale 26 is subdivided into smaller ranges.

Once the regrinding length is established, it is possible to compensate for the regrinding length, by placing one or more compensation shims below the tool die 11 whose combined thicknesses correspond to the regrinding length read on the scale 26. It is also possible to adapt the scale 26 to the minimum thickness of the compensation shims. For example, in some cases, the maximum regrinding length is 1 mm and the thicknesses of the compensation shims increase in increments of 0.1 mm. In such cases, the scale 26 can have ten increments that are each separated by 36° so that as the regrinding length is reduced by 0.1 mm properly sized compensation shims can be used to compensate for the regrinding.

It is additionally possible to include an identification mark to the inclined portion 24 in the form of an inscription (e.g., a dimension), from which the regrinding amount can be read. It is also possible to omit the scale 26 completely if, there is a reference formed on the tool die 11 using the axial groove 27, from which the removed angular range of the identification mark 25 can be determined. The identification mark 25 does not have to be continuous. For example, in some embodiments, the identification mark 25 includes multiple marks that are also arranged in a helical manner, one or more marks being arranged in each of the circumferential regions of the inclined portion 24 separated by the radial grooves 26, respectively.

Figure 3:
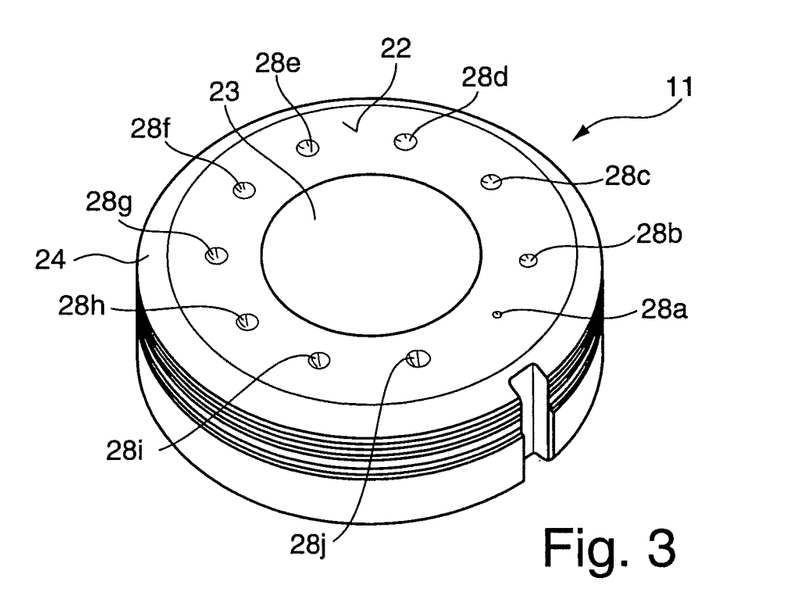
FIG. 3 illustrates a tool die having several identification marks formed along an end face of the tool die that extend through the end face to different depths within the tool die.

Another possibility for determining the current regrinding length of a tool die 11 is illustrated in FIG. 3. The tool die 11 shown has an identification mark with ten recesses 28a-j in the form of indentations that extend through the end face 22 and into the portion of the tool die 11 underlying the end face 22 to varying depths. In the illustrated example, the recesses 28a-j include ten shallow indentations that have depths varying from 0.1 mm to 1 mm. By counting the number of recesses 28a-j that remain after regrinding, it is possible to determine the current regrinding state of the tool die 11. For example, if only seven of the recesses 28a-j are visible, the regrinding amount is 0.3 mm. The recesses 28a-j can also be constructed in the form of shoulders or pockets. In addition to forming multiple indentations having different depths, it is also possible to form a stepped hole for displaying the regrinding length in the end face 22. For example, the stepped hole can have multiple steps that each correspond to a particular distance, and therefore, the number of visible steps in the hole represent a measurement for the regrinding length. Using the techniques described above, the regrinding length of the tool die 11 can typically be identified without requiring additional measurements. The regrinding length can then be compensated for (e.g., by using compensation discs) so that the required height of the tool die 11 (e.g., 30 mm) can be achieved.

Figure 4:
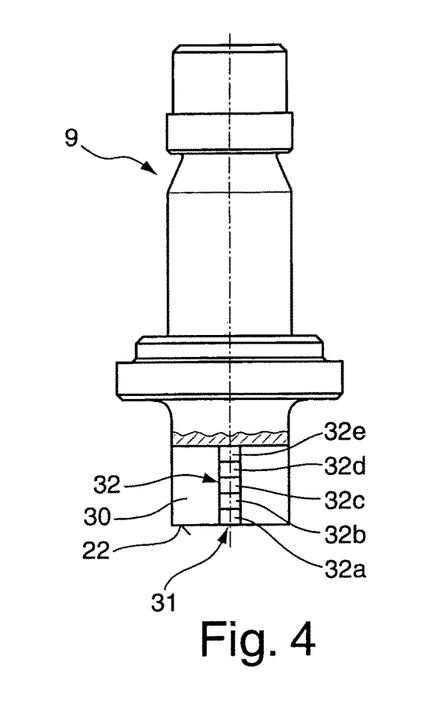
FIG. 4 illustrates a tool stamp having a hole formed along its end face to receive a plug that includes several identification marks along its length.

Referring to FIG. 4, a similar method can also be used to determine the regrinding length of a tool stamp 9 in the form of a punching stamp. The tool stamp 9 includes a punching/cutting portion 30 on which a region of the punching stamp 9 provided for regrinding is formed. A hole 31 is formed along the end face 22 of the punching/cutting portion 30. A plug 32 (shown in FIG. 4 in a part-section) is pressed into the hole 31 and extends through the punching/cutting portion 30. The plug 32 can be formed of several portions (e.g., multiple discs) 32a-e of different colors and/or thicknesses. The sequence of the different colors corresponds to a coding of the regrinding length. During a regrinding operation, the plug 32 is also partially removed (i.e., ground away), whereby the color of the plug 32 which can be seen at the end face 22 as soon as the thickness of a respective portion 32a-e has been removed changes. The current regrinding length can consequently be determined using the visible color of the plug 32 at the end face 22 of the punching/cutting portion 30. A corresponding identification mark in the form of a plug can also be applied to a tool die 11 by forming a hole in the tool die 11 and inserting the plug.

Figure 5:
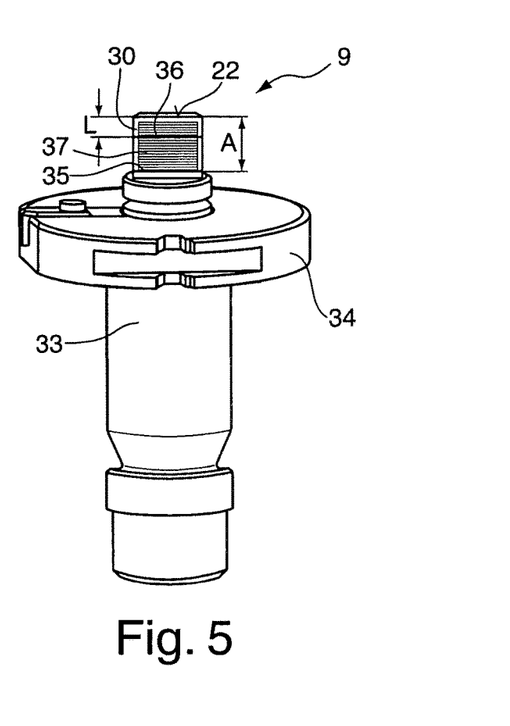
FIG. 5 illustrates a punching stamp having an identification mark indicating the maximum regrinding length and a limit mark, and an adjustment ring.

FIG. 5 illustrates another possibility for displaying the regrinding state of a punching stamp 9. The punching stamp 9 includes identification marks that not only indicated the regrinding length of the punching stamp 9, but also the thickness of workpieces 4 that can be processed using the punching stamp 9. Along a punching/cutting portion 30 of the punching stamp 9, which has not yet been reground, an identification mark in the form of a limit mark 35 is applied with a spacing A from the end face 22. The spacing A corresponds to a position where an upper edge of a thickest workpiece 4 to be processed using the punching stamp 9 would be when the punching stamp 9 is at the maximum insertion depth, taking into account the maximum regrinding length L.

For example, the spacing A from the end face 22 to the limit mark 35 for an unused punching stamp 9 is determined by the following equation:

spacing $A$=regrinding length $L$ (e.g., 6.5 mm)+maximum sheet thickness (e.g., 8.0 mm)+insertion depth (e.g., 1.0 mm)=(e.g., 15.5 mm).

A typical value for the spacing A is therefore about 15.5 mm. When such a spacing A is used between the limit mark 35 and the end face 22, it helps to ensure that the limit mark 35 does not contact the workpiece 4 during workpiece processing so that it is protected from wear. Multiple additional marks can be included to provide a scale 37 in order to simplify the determination of the spacing A between the end face 22 and the limit mark 35 as the punching stamp 9 is reground. The multiple marks of the scale 37 are separated by a distance (e.g., 0.1 mm) so that distance from the limit mark 35 to the end face 22 can be determined in order to estimate the maximum sheet thickness that can be processed using a particular tool. In some cases, wear of the mark 36 and the scale 37 can occur due to friction of the punching cutting portion 30 rubbing on the workpiece 4.

If the punching stamp 9 illustrated in FIG. 5 is reground, the punching stamp 9 can typically be used with little to no limitations in most sheet thicknesses up to a sheet thickness that corresponds to the remaining spacing A of the limit mark. As subsequent regrinding of the punching stamp 9 is performed, the thickness of a sheet that can still be processed using the same punching stamp 9 consequently decreases.

The following table can be used to estimate the maximum acceptable sheet thicknesses that can be processed based on spacing A of a punching stamp.

TABLE 1

| Spacing A between end face and mark: | Acceptable sheet thicknesses |
|---|---|
| A is approximately 15.5 mm | Maximum sheet thickness of 8 mm (using a new stamp) |
| A > 10 mm (stamp has been reground) | Maximum sheet thickness of 8 mm |
| 10 mm > A > 5 mm | Maximum sheet thickness is approximately spacing A - 2 mm. |
| A < 5 mm | Maximum sheet thickness is approximately 3 mm. (stamp is "used" or spent) |

For a user that would like easily determine whether the punching stamp 9 can be used for a desired application, the estimation provided in Table 1 is typically sufficient. For tool selection, the marking and scale 37 is typically sufficiently precise for most applications. The actual length of a punching stamp 9 may also be stored in a tool management system.

For example, if a punching stamp 9 is intended to process a sheet thickness of 3 mm, a presetter typically selects only those punching stamps 9 in which the mark has at least 5 mm spacing remaining with respect to the end face 22 so that the punching stamp 9 will be able to adequately penetrate the entire thickness of the sheet. For a task with a sheet thickness of 8 mm, the presetter typically selects a punching stamp 9 with a minimum spacing A of approximately 10 mm. An additional mark 36 can be included to provide additional information, such as that a maximum regrinding length L (e.g., of about 6.5 mm) has been used.

If a differentiation is to be made between new and reground tool components, it is possible to apply an identification mark to the end face 22, typically in the form of lettering that designates the new state of the tool component. It is also possible to provide a mark along the end face 22 of the punching stamp 9 that is identified with a color (e.g., black). The mark can be a discrete mark or alternatively it can be applied over the entire end face 22. Due to the relatively flat regrinding process, the mark is removed from the end face 22 so that the regrinding state can be identified. A similar mark can also be applied to tool dies or other tool components to denote a new tool component.

In addition to designating the purely new state, the end-face identification mark can also contain information relating to a feature, characteristic, and/or property of the tool component. Examples of such features, characteristics, or properties include a total length and/or thickness of the tool component or the shape or machine group on which the tool component is intended to be used. The identification mark can be in the form of text and/or symbols in which a specific feature of the tool component is encoded or indicated.

Figure 6A:
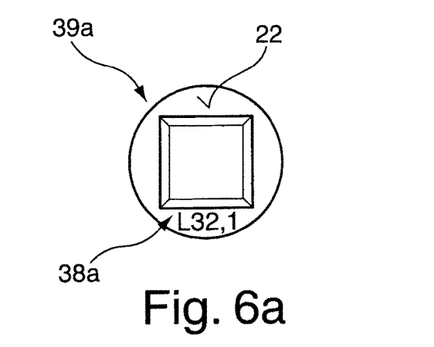
FIGS. 6a, b illustrate two end faces of shaping tools, on which identification marks that indicate the respective tool length are included.
Figure 6B:
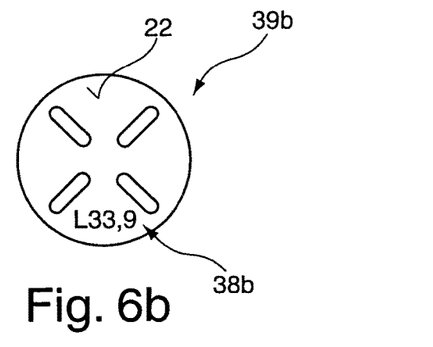

Examples of identification marks 38a, 38b at the end face 22 of two shaping tools 39a, 39b are shown in FIGS. 6a, b. The identification marks 38a, 38b each have numbers that indicate the tool length (in mm) and a symbol (L) that indicates the type of information being presented (e.g., L for length). Since the shaping tools 39a, 39b are not yet reground, the information relating to the tool length is retained, as long as it is not removed due to wear caused by friction with the workpiece. With shaping tools 39a, 39b or with other tool components that are typically not reground (e.g., punching needles), it is also possible to provide additional identification marks to indicate specific features (e.g., length, shape, or associated equipment information) at a location other than the end face 22. The end-face identification mark can also be provided on tool stamps which are constructed as inserts for a turret tool, since these are typically also reground. Typical maximum regrinding lengths for such inserts are about 0.5 mm.

The identification marks 38a, 38b can be applied to the components by any of various types of machining processes (e.g., by laser inscription). In some cases, the marks 38a, 38b are formed in an operating step together with additional inscriptions. It is also alternatively possible to include manual identifications. By including various identifications it is possible to omit additional machining processing operations or the application of additional inscription elements (e.g., signs, adhesive labels, or tags). Additionally, tool components that have already been manufactured can typically be retrofit to include an identification mark in the form of an inscription in a relatively simple manner.

The information read from the tool components described above (e.g., the regrinding length) can be input into the machine tool 1 (shown in FIG. 1) by a machine operator at an operator console of the machine tool 1 and stored in the storage device 19 so that this information is available during processing using the machine tool 1.

A number of embodiments of the invention have been described. Nevertheless, it will be understood that various modifications may be made without departing from the spirit and scope of the invention. Accordingly, other embodiments are within the scope of the following claims.

What is claimed is:

1. A tool die for processing of plate-like workpieces, the tool die comprising:
   an end face adjoined by a tool region provided for regrinding; and
   at least one identification mark located on the tool die to indicate an amount of shortening of the tool region as a result of regrinding,
   wherein the tool region comprises a frustoconical inclined portion formed around the end face,
   wherein the identification mark extends circumferentially along an outer surface of the frustoconical inclined portion in a substantially helical manner,
   wherein the tool die defines a smooth bore extending from the end face, the smooth bore being configured to receive a punching tool for processing a plate-like workpiece supported above the end face of the tool die, and
   wherein the identification mark travels from the end face in an axial direction that is perpendicular to the end face to a maximum axial length of the identification mark, wherein the identification mark terminates at a single revolution around the end face at the maximum axial length, and wherein the maximum axial length corresponds to a maximum regrinding length of 1 mm from an initial axial position of the end face in a new, non-ground state of the tool die.

2. The tool die according to claim 1, further comprising a scale for determining the amount of shortening of the tool region from the identification mark.

3. The tool die according to claim 2, wherein the scale is in the form of a dial.

4. The tool die according to claim 1, wherein at least one characteristic of the identification mark changes axially with respect to the end face.

5. The tool die according to claim 4, wherein the characteristic changes gradually.

6. The tool die according to claim 4, wherein the characteristic is shape or color.

7. The tool die according to claim 1, wherein the identification mark is spaced from the end face so that it is located outside the tool region that is ground during a regrinding process.

8. The tool die according to claim 1, wherein the identification mark is spaced from the end face by a distance that corresponds to a maximum regrinding length of the tool die.

9. The tool die according to claim 1, wherein the identification mark comprises a helical line.

10. The tool die according to claim 1, wherein the end face of the tool die defines an opening from which the smooth bore extends, the opening being configured to receive the punching tool.

11. The tool die according to claim 1, wherein the amount of shortening is provided along a direction perpendicular to the end face.

12. The tool die according to claim 1, wherein the smooth bore is configured to receive a portion of the plate-like workpiece that is punched through by the punching tool.

13. The tool die according to claim 1, wherein the frustoconical inclined portion has a circular cross-sectional shape with a plurality of grooves that define a scale for determining the amount of shortening of the tool region from the identification mark.

14. The tool die according to claim 1, wherein in the new, non-ground state of the tool die, the identification mark is visible, in its entirety, within a 360 degree angle traversed by the identification mark within the single revolution, and wherein in a completely reground state of the tool die, the identification mark is completely removed such that the identification mark is not visible.

15. The tool die according to claim 14, wherein in the completely reground state of the tool die, a part of the frustoconical inclined portion remains visible.

16. The tool die according to claim 1, wherein the end face has an annular shape.

17. A machine tool for punching and/or shaping plate-like workpieces, the machine tool comprising:

a punching tool; and
a tool die comprising:
- an end face adjoined by a tool region provided for regrinding, and
- at least one identification mark located on the tool die to indicate an amount of shortening of the tool region as a result of regrinding, wherein the tool region comprises an inclined portion that is formed circumferentially around the end face, wherein the identification mark extends circumferentially along an outer surface of the inclined portion in a substantially helical manner, and wherein the tool die defines a smooth bore extending from the end face, the smooth bore being configured for receiving the punching tool.

* * * * *

UNITED STATES PATENT AND TRADEMARK OFFICE
CERTIFICATE OF CORRECTION

| | |
|---|---|
| PATENT NO. | : 10,046,375 B2 |
| APPLICATION NO. | : 13/240367 |
| DATED | : August 14, 2018 |
| INVENTOR(S) | : Stefan Buettner et al. |

It is certified that error appears in the above-identified patent and that said Letters Patent is hereby corrected as shown below:

In the Claims

<u>Column 10</u>
Line 18, in Claim 2, after "according" insert -- to --

Signed and Sealed this
Sixteenth Day of October, 2018

Andrei Iancu
*Director of the United States Patent and Trademark Office*